(12) United States Patent
Uchiyama et al.

(10) Patent No.: US 6,286,619 B1
(45) Date of Patent: Sep. 11, 2001

(54) ATV TRANSMISSION

(75) Inventors: Masayuki Uchiyama; Masamitsu Fukushima, both of Shizuoka (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 09/504,066

(22) Filed: Feb. 15, 2000

(30) Foreign Application Priority Data

Feb. 15, 1999 (JP) .................................................. 11-036541

(51) Int. Cl.[7] .......................... B62K 25/04; B60K 17/06; B60K 17/342
(52) U.S. Cl. .......................... 180/337; 180/350; 180/351; 180/357; 180/361; 180/364; 180/217; 180/231; 74/607; 474/114
(58) Field of Search .................................. 74/607, 606 R, 74/333; 474/101, 113, 114, 115, 116, 117; 180/241, 215, 251, 217, 227, 231, 239, 347, 344, 348, 349, 350, 351, 353, 293, 294, 297, 377, 378, 374, 357, 355, 356, 363, 364, 366, 369–371, 373, 359–361

(56) References Cited

U.S. PATENT DOCUMENTS

| 690,158 | * | 12/1901 | Lane ...................................... 180/297 |
| 1,967,415 | * | 7/1934 | Lesage .................................. 180/231 |
| 2,094,871 | * | 10/1937 | Brown .................................. 180/359 |
| 2,910,130 | * | 10/1959 | Schlaphoff .......................... 180/227 |
| 3,001,599 | * | 9/1961 | Fryar ..................................... 180/227 |
| 3,099,165 | * | 7/1963 | Heth et al. ............................. 73/342 |
| 3,780,834 | * | 12/1973 | Lottridge et al. ..................... 180/370 |
| 3,974,892 | * | 8/1976 | Bolger ................................. 180/227 |
| 4,003,443 | * | 1/1977 | Boughers ............................. 180/217 |
| 4,023,428 | * | 5/1977 | Dysard ................................. 474/113 |
| 4,232,569 | * | 11/1980 | Hauser et al. ......................... 74/607 |
| 4,287,960 | * | 9/1981 | McConnell .......................... 180/217 |
| 4,582,157 | | 4/1986 | Watanabe . |
| 4,583,961 | * | 4/1986 | Kawasawa et al. ................. 474/113 |
| 4,614,507 | | 9/1986 | Ishino . |
| 4,667,760 | * | 5/1987 | Takimoto ............................. 180/215 |
| 4,678,053 | * | 7/1987 | Watanabe et al. ................... 180/217 |
| 4,811,810 | * | 3/1989 | Watanabe ............................. 180/215 |
| 4,887,992 | * | 12/1989 | Dixon .................................. 474/101 |
| 5,279,383 | | 1/1994 | Gustafsson . |
| 5,361,864 | | 11/1994 | Tanaka . |
| 5,469,930 | * | 11/1995 | Wiers .................................. 180/227 |
| 5,918,695 | | 7/1999 | Matsuura et al. . |

* cited by examiner

Primary Examiner—Lanna Mai
Assistant Examiner—Ruth Ilan
(74) Attorney, Agent, or Firm—Knobbe, Martens, Olson & Bear LLP (57) ABSTRACT

An all terrain vehicle includes an engine and a final drive assembly. The engine includes an output shaft that supports a drive sprocket or pulley. The final drive assembly comprises an input shaft that supports a driven sprocket or pulley and a brake disc. A flexible transmitter such as a belt or a chain connects the drive sprocket or pulley and the driven sprocket or pulley. The final drive assembly is formed separate of the engine and spaced apart from the engine when the two components are mounted to a frame of the vehicle. The driven sprocket or pulley is positioned on an upper portion of the final drive assembly while a lower portion of the final drive assembly is pivotally connected to the frame. The final drive assembly can be pivoted to adjust a tension level within the flexible transmitter. The final drive assembly can be selectively secured in a pivotal position by a support rod and/or a set of slotted brackets.

35 Claims, 7 Drawing Sheets

ATV TRANSMISSION

BACKGROUND OF THE INVENTION

1. Field of the Invention

The present invention generally relates to drive arrangements for all terrain vehicles. More specifically, the present invention relates to separated engines and final drive assemblies for use in all terrain vehicles.

2. Related Art

All terrain vehicles are constructed for use in all kinds of rough, rocky and uneven terrain. The vehicles generally comprise a frame that defines an engine compartment, an engine positioned within the engine compartments and a transmission that drives a set of wheels with power from the engine. The transmission typically is included within a transmission case that is directly connected to the engine and generally powers the rear wheels through a shaft and differential assembly. Preferably, substantial clearance is maintained between the vehicle and its associated components and the ground over which the vehicle is being operated.

Recently, manufacturers have been down sizing the all terrain vehicles to create a more compact vehicle. As is known, more compact vehicles often weigh less and cost less to manufacture and operate. The lighter weight improves engine performance and eases transportation. Accordingly, to reduce vehicle size, many variations of transmission shaft mounting have been developed. The transmission shafts typically all are positioned near the engine and must be positioned to accommodate the components of the engine.

In addition, manufacturing such compact vehicles has been a difficult task. The engines and the transmissions can be assembled together outside of the vehicle or positioned inside of the vehicle and then joined together. Either method is difficult in production operations. Assembling the engine and transmission as a unit yields a bulky and heavy unit that must be shoehorned into the engine compartment. Yet, placing both components into the engine compartment before securing them together is made difficult due to the small size of the engine compartment.

SUMMARY OF THE INVENTION

Accordingly, an offroad vehicle having a separate engine and final drive has been developed. The two components are positioned within the vehicle and connected by a flexible drive component, such as a chain. The chain is driven by a drive sprocket. The final drive includes a driven sprocket that transfers power to the drive shaft of the rear wheels. The driven sprocket generally is larger than the drive sprocket and, thus, in some arrangements, can disadvantageously depend downwardly into the clearance zone defined between the vehicle's frame and the ground. In addition, tension on the chain can decrease over time such that the vehicle needs to be extensively serviced before the chain disengages from the sprockets. Moreover, when a separated final drive is used, a large reaction force can be set up by the flexible drive component and the final drive should be securely mounted to oppose this reaction force.

Thus, an offroad vehicle is desired in which a final drive and an engine have been separated. The two components should be connected by a flexible transmitter. The tension on the flexible transmitter should be easily adjusted and the driven sprocket should be mounted so as to not depend greatly into the vehicle clearance zone. The final drive should be securely mounted to the frame to counter reaction forces set up during engagement of the engine with the final drive.

Accordingly, one aspect of the present invention involves an all terrain vehicle comprising a frame having a lower frame. At least one rear wheel is mounted to the frame and at least one front wheel is mounted to the frame. An engine compartment is defined within the frame between the front wheel and the rear wheel and an engine is mounted within the engine compartment. A final drive is mounted to the frame separately from the engine. A drive shaft connects the rear wheel and the final drive and the rear wheel is drivingly connected to the engine through the final drive. The drive shaft extends generally transverse to a longitudinal plane that substantially bisects the frame. The final drive is positioned such that at least a portion of the final drive is intersected by the drive shaft. The final drive comprises a driven sprocket and the engine comprises a drive sprocket. The drive sprocket is drivingly connected to the driven sprocket by a flexible transmitter and the driven sprocket is positioned to lie entirely above a plane defined by the lower frame.

Another aspect of the present invention involves an all terrain vehicle comprising a frame, a pair of rear wheels that are rollably mounted to the frame and at least one front wheel that is rollably mounted to the frame. The rear wheels turn about a first axis and the at least one front wheel turns about a second axis. An engine is mounted to the frame between the first axis and the second axis and a final drive is mounted to the frame and is separated from the engine. The rear wheels are drivingly connected to the engine and the final drive is at least partially positioned between the rear wheels. The final drive comprises a driven sprocket and the engine comprises an output shaft and a drive sprocket. The drive sprocket is drivingly connected to the output shaft and the drive sprocket powers the driven sprocket with a flexible transmitter.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENTS OF THE INVENTION

Figure 1:
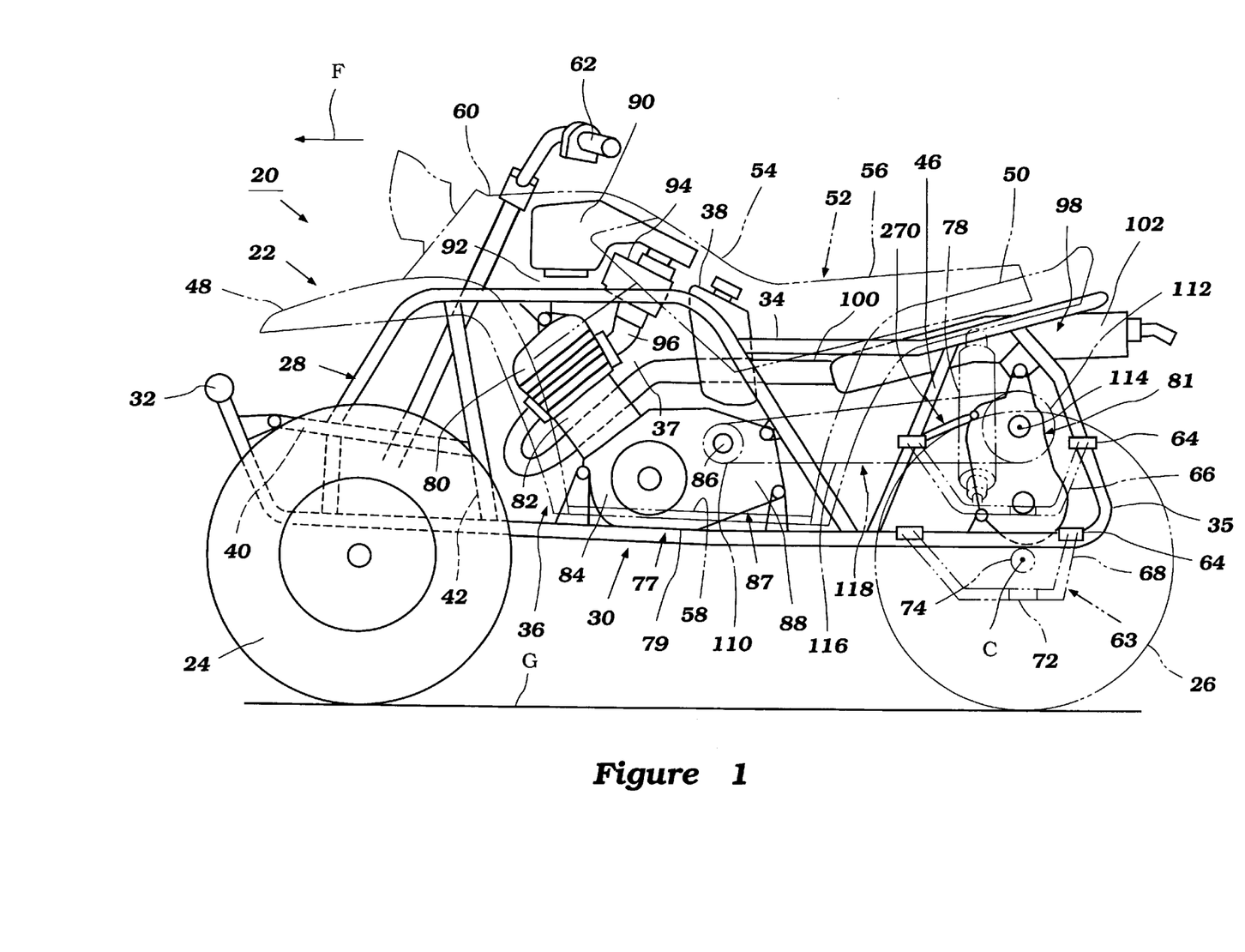
FIG. 1 is a side view of a vehicle being constructed in accordance with certain features, aspects and advantages of the present invention, with certain internal components of the vehicle being shown in dashed lines and certain body components being shown in phantom lines.
Figure 2:
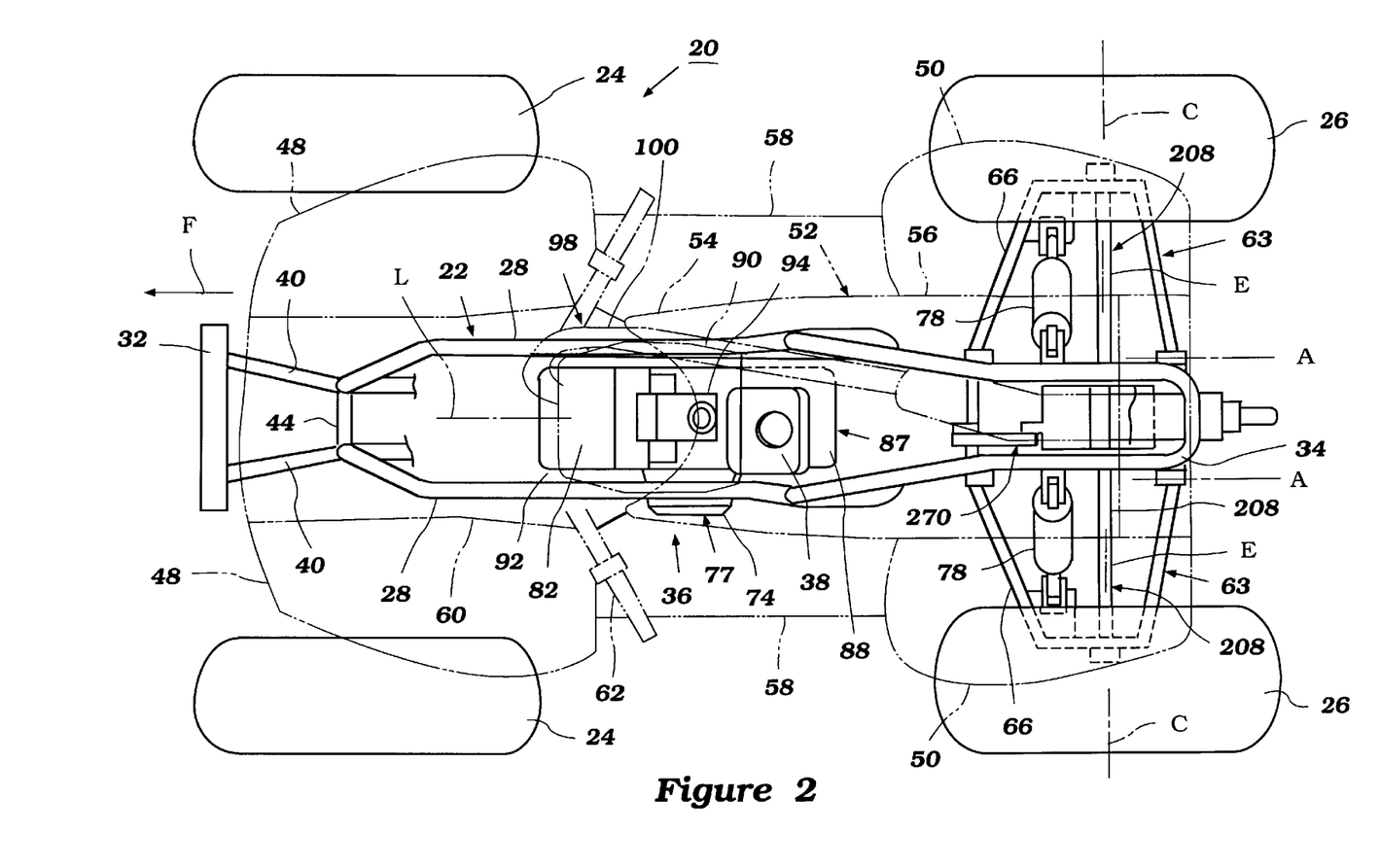
FIG. 2 is a top view of the vehicle of FIG. 1 illustrating a placement of an engine and a final drive assembly.
Figure 3:
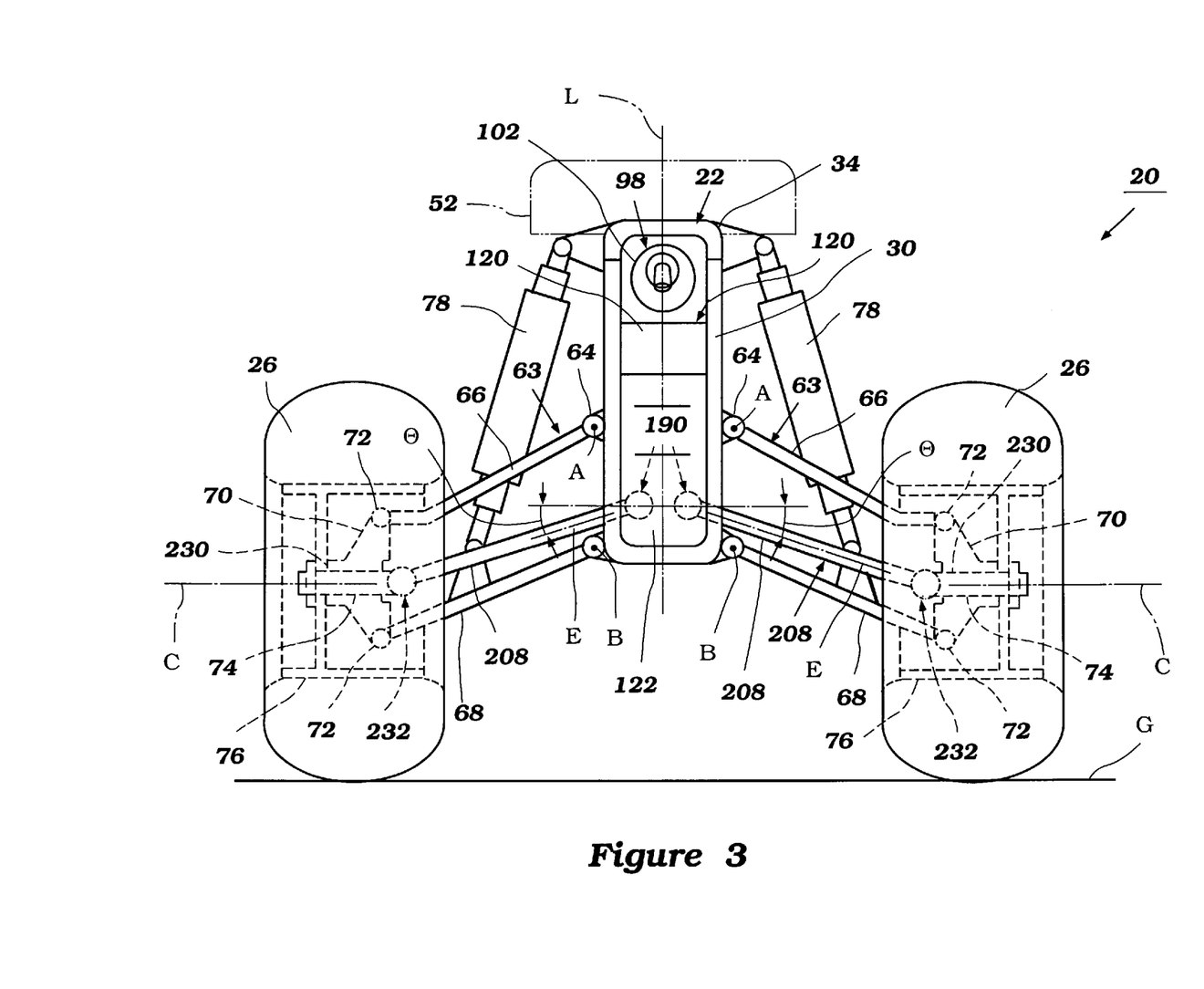
FIG. 3 is a rear view of the vehicle of FIG. 1 illustrating a suspension arrangement and the placement of the final drive assembly.
Figure 4:
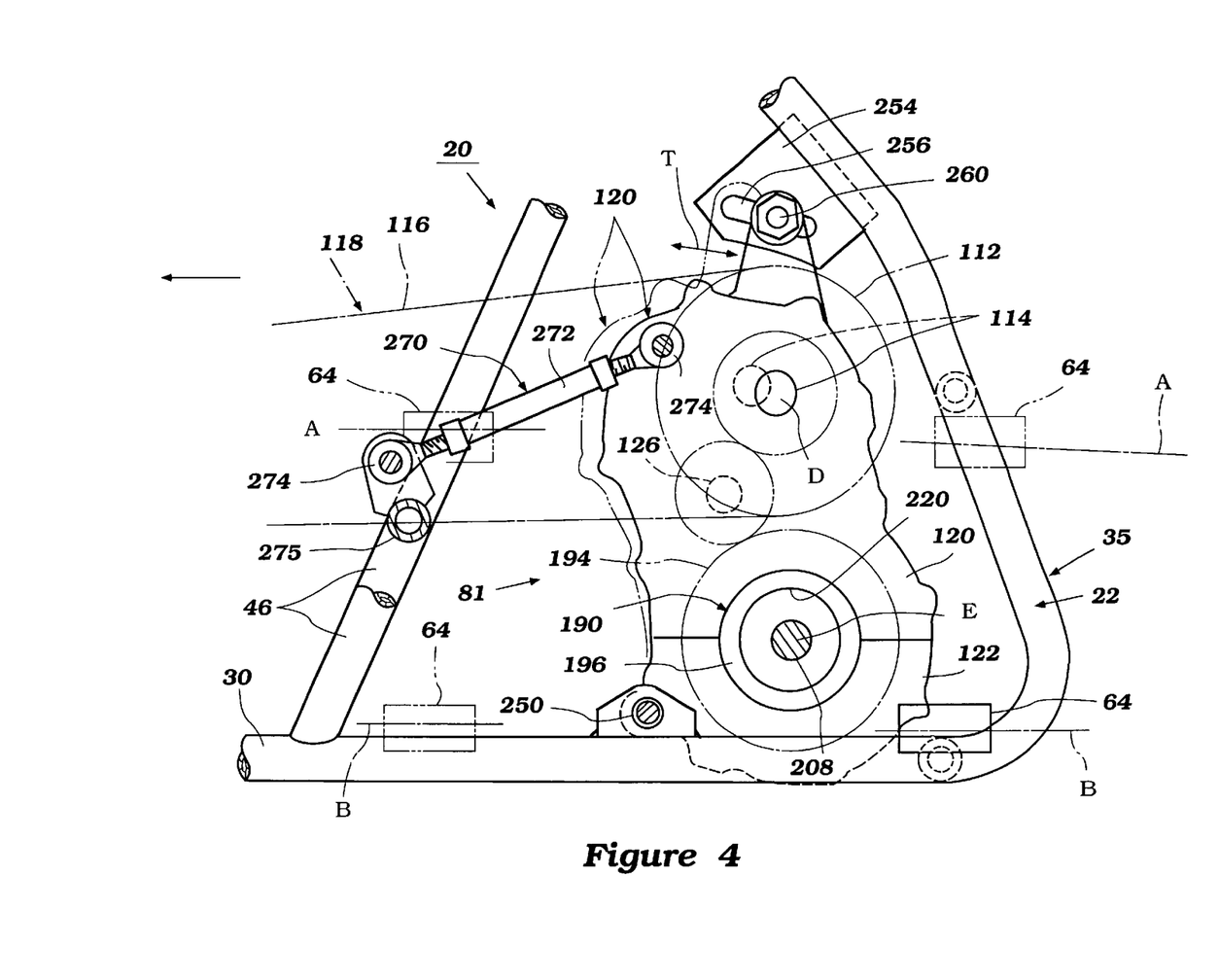
FIG. 4 is a partial side view of the vehicle of FIG. 1 illustrating two positions of the final drive assembly relative to a frame assembly.

With reference now to FIGS. 1 through 3, an all terrain vehicle is illustrated and is generally identified by the reference numeral 20. The vehicle 20 incorporates a transmission that is arranged and configured in accordance with certain features, aspects and advantages of the present invention. The illustrated vehicle 20 preferably is adapted for off-road operation; however, certain features, aspects and advantages that will become apparent below can be used in street vehicles. In addition, as the illustrated vehicle 20 is only a typical application for the present invention, other applications will become readily apparent to those of ordinary skill in the art. For this reason, many details of the illustrated vehicle 20 that do not require an understanding for one of ordinary skill in the art to practice the present invention will be omitted; however, the omitted details should be considered well-known to those of ordinary skill in the art.

With continued reference to FIG. 1, the vehicle generally comprises a frame assembly 22 that is supported by a set of wheels. In the illustrated arrangement, a spaced pair of front wheels 24 and a spaced pair of rear wheels 26 support the frame assembly 22. Of course, one or more than two front wheels and one or more than two rear wheels also can be used. The wheels 24, 26 preferably are a low-pressure, balloon-type of tire that is specifically designed for off-road use.

The frame assembly 22 generally is of a welded-up type comprising a number of tubular members connected by welds and fasteners. With reference to FIG. 1, the illustrated frame assembly 22 comprises an upper frame 28 and a lower frame 30. Both the upper frame 28 and the lower frame 30 preferably comprise a pair of members that are substantially mirror images of one another. As illustrated, the lower frame 30, preferably extends in a generally longitudinal direction from a forward bumper 32 to a seat rail 34 and has a portion that defines a plane that is substantially parallel to the ground G over which the vehicle is operated. The illustrated lower frame 30 bends downward and rearward from the forward bumper 32 and a rear portion 35 of the lower frame 30 bends upward and then forward to the seat rail 34. Such a construction generally defines an engine compartment 37 in which an engine 36 can be secured. The engine generally is secured between the front wheels and the rear wheels.

The illustrated upper frame 28 preferably extends in the same generally longitudinal direction from a forward portion of the lower frame 30 to a rearward portion of the lower frame. More specifically, the upper frame 28 extends upward from the lower frame 30 from a location slightly forward of an axis of rotation of the front wheels 24 and then bends rearward. The upper frame 28 also has a portion that extends substantially rearward before bending downward toward the lower frame 30. The illustrated upper frame 28 bends downward at a location just forward of a fuel tank 38 and connects to the lower frame 30 at a location just forward of the rear wheels 26.

A pair of bumper support bars 40 extend generally rearward from the bumper 32 and support the bumper 32 during frontal impacts. As illustrated, the support bars 40 desirably bend inward near the upper frame 28. In some arrangements, the support bars 40 extend beyond the upper frame 28 and the upper frame 28 is split with an upper portion being attached to the support bars 40 and a lower portion extending between the support bars 40 and the lower frame 30. In the illustrated arrangement, the support bars 40 are split into a forward portion and a rearward portion. The forward portion extends between the bumper 32 and the upper frame 28 while the rearward portion extends between the upper frame 28 and a supporting down tube 42.

The illustrated forward down tube 42 extends between the upper frame 28 and the lower frame 30 at a downwardly and rearwardly sloping angle. In the illustrated arrangement, the angle is rather steep and provides support while maintaining a construction that eases servicing of the internal components. Of course, a longer down tube 42 that extends at a less steep angle also can be used depending upon the application.

Any number of cross members 44 can be used to join the two sides of the frame assembly 22. With reference to FIG. 2, at least one cross member 44 is positioned between the forward most ends of the upper frame 28 or near the forward most ends of the upper frame 28 in the illustrated arrangement. Of course, any number of other cross members can be strategically positioned elsewhere within the frame assembly 22.

With continued reference to FIGS. 1 through 3, the seat rails 34 generally extend rearward from the upper frame 28. In the illustrated arrangement the seat rail 34 has an elongated U-shape such that the two generally parallel legs of the seat rail 34 are formed of a single member. Of course, other constructions can also be used. The seat rail 34 generally is supported by the upper frame 28, the lower frame 30 and a rearward down tube 46. The illustrated down tube 46 extends in a steeply inclined forward angle but can incline less steeply in some arrangements.

The frame assembly 22 carries a number of body components. For instance, a front fender assembly 48 is secured to the frame assembly 22 and covers the front wheels 24 in a known manner. Similarly, a rear fender assembly 50 is secured to the frame assembly 22 and covers the rear wheels 26 in a known manner. A seat 52 and the fuel tank 38 also are secured to the frame assembly in a location generally defined between the front fender assembly 48 and the rear fender assembly 50. The fuel tank 38 preferably is positioned forward of the seat 52. More particularly, the fuel tank 38 is positioned below an upwardly sloping forward portion 54 of the seat 52 that lies generally forward of a rider position 56.

As is known, typically a rider sits upon the seat 52 with a leg positioned to either side of the seat 52 and with each foot resting on an associated foot rest 58. The foot rests 58 preferably extend between the front fender assembly 48 and the rear fender assembly 50 and preferably are positioned inboard of the outer surfaces of the rear wheels 26.

A fuel tank and engine compartment cover 60 extends rearward from the illustrated front fender assembly 48 and blends with the seat 52 at a rear end of the cover 60. In the illustrated arrangement, the cover 60 extends between two separate front fenders of the front fender assembly 48; however, the cover 60 and the front fender assembly 48 can be combined in some applications.

A steering handle assembly 62 extends down through the cover 60 from a location defined generally forward of the seat 52. The steering handle assembly 62 includes a number of controls that are well known to those of ordinary skill in the art. In addition, the steering handle assembly 62 generally is constructed to direct the vehicle 20 along a chosen operational direction by rotating the front wheels about a generally vertical axis or a pair of generally vertical axes. As such steering handle assemblies are very well known to those of ordinary skill in the art, and because the present steering handle assembly 62 does not form an integral part of the present invention, further description is deemed unnecessary.

With reference now to FIG. 3, the illustrated vehicle 20 also comprises an independent rear suspension system 63. While other types of suspension systems can be used in some arrangements, the illustrated independent rear suspension system is presently preferred. The illustrated suspension system 63, as will become apparent, is of the doublewishbone type; however, other types of independent suspension arrangements also can be used.

With continued reference to FIG. 3, a pair of pivotal connections 64 are provided on each side of the frame assembly 22. The illustrated pivotal connections 64 generally comprise a pin and sleeve arrangement is used; however, the pivotal connections 64 can be formed in any other suitable manner.

A pair of wishbones are connected to the frame assembly 22 through the pivotal connections 64. More specifically, an upper wishbone 66 and a lower wishbone 68 are connected to the frame assembly 22 with the pivotal connections 64. The wishbones 66, 68 are capable of pivotal movement relative to the frame assembly 22 about a first axis A and a second axis B, respectively.

The other ends of the wishbones 66, 68 are connected to a carrier hub 70. More particularly, the central regions of the wishbones 66, 68, which are positioned between the two pivotal connections 64 to the frame assembly 22 on each of the wishbones, 66, 68, are connected to by upper and lower pivotal connections 72. The generally parallel construction of the wishbones 66, 68 and the arrangement of the connections 64, 72 allow each of the rear wheels 26 to translate up and down without any significant variation in contact surface between the wheels 26 and the ground G.

The carrier hub 70 rotates about a third axis, C. The wheels 26 also rotate about the same third axis C. With continued reference to FIG. 3, the carrier hub 70 journals a stub shaft 74 on which a rim 76 is mounted using a hub arrangement (not shown). The wheels 26, of course, are mounted to the rims 76 in any suitable manner.

Movement of the wheels 26 relative to the frame assembly 22 preferably is damped and somewhat controlled using shock absorbers 78. The shock absorbers 78 can be of any suitable type and can be attached to the frame assembly and the suspension system through any suitable connection.

With reference again to FIG. 1, the illustrated wheels 26 are driven by a drive unit 77 that preferably includes the engine 36 and a final drive 81. While the illustrated vehicle 20 uses a two-wheel drive arrangement, the vehicle 20 also could use a four wheel drive arrangement in some applications. Moreover, one or more than two wheels can be driven in further arrangements, as is generally known to those of ordinary skill in the art.

The illustrated engine 36 generally has an engine body 79 that comprises a single cylinder and operates on a four-cycle principle. Of course, other numbers of cylinders and other operating principles (i.e., two-cycle, rotary) can be used in other arrangement. The illustrated engine is constructed in a well known manner and generally comprises a cylinder head 80, a cylinder body 82, and a crankcase 84. The head 80 and the crankcase 84 are positioned to opposite sides of the cylinder body 82. A piston (not shown) is preferably reciprocally mounted within the cylinder body 82 and the piston preferably drives an output shaft 86 through a suitable transmission 87 that is mounted within a transmission case 88 formed rearward of the crankcase 84.

Air is supplied to the engine for combustion through a suitable induction system. The illustrated system comprises an air filter 90 that is disposed beneath the cover 60 and that is positioned within a void 92 formed beneath the cover 60. This arrangement substantially protects the inlet to the induction system through the air filter 90 from large particles and water.

Air is delivered through the filter 910 to a charge forming device 94. In the illustrated arrangement, the air is delivered to a carburetor 94 for mixing with fuel; however, it is anticipated that the present invention also can be used with a fuel injected engine (i.e., direct injection, indirect injection). From the carburetor 94, the air-fuel mixture is supplied through an intake pipe 96 to a combustion chamber defined within the cylinder. The intake pipe 96 may be flow controlled using any suitable valve arrangement, which are well known to those of ordinary skill in the art.

After combustion, the exhaust gases are vented to the atmosphere through an exhaust system 98. The exhaust gases flow out of the combustion chamber into a first exhaust pipe 100. This exhaust pipe 100 turns the exhaust gas flow rearward and toward a muffler arrangement 102. The muffler arrangement 102 allows the gases to expand and controls the noise of the engine somewhat. The muffler arrangement 102 is preferably tucked under a portion of the frame assembly 22 for protection.

With reference now to FIG. 1, output from the output shaft 86 is transferred to the final drive 81 through a suitable transmission element. While some arrangements can employ a final drive that is integrally formed with the engine, in the illustrated arrangement, the final drive 81 is formed separate from the engine 36 and its associated transmission 88. The separation allows the two components to be positioned within the frame individually rather than having to build the engine and transmission and then position the assembly into the frame. Thus, the separation eases manufacture and assembly. In addition, by moving the final drive 81 toward the rear of the vehicle, the engine and transmission 88 can be more compactly constructed and the associated vehicle will benefit from a better weight distribution. Thus, the final drive preferably is positioned such that it would be intersected by drive shafts extending to the rear wheels. Of course, it could be moved forward or rearward of this position in some arrangements, but such a construction would unnecessarily complicate the construction of the vehicle 210.

A drive sprocket 110 is mounted on the output shaft 86 of the engine 36 and the transmission 88. A driven sprocket 112 is secured to an input shaft 114 of the final drive assembly 81. The driven sprocket 112 is driven by the drive sprocket 110 using a flexible transmitter 116. Together, the sprockets 110, 112 and the flexible transmitter 116 form a coupling transmission assembly 118. The coupling transmission assembly 118 is designed to transfer power between the transmission 88 and the final drive 81. Of course, in some arrangements, the driven sprocket 112 can be mounted to directly drive the rear wheels without the power passing through a final drive assembly 81. The sprockets 110, 1 12 can be pulleys, variable speed pulleys, or other types of flexible transmitter drive components. In addition, the flexible transmitter 116 can be a belt, chain, band or other continuously formed loop.

Figure 5:
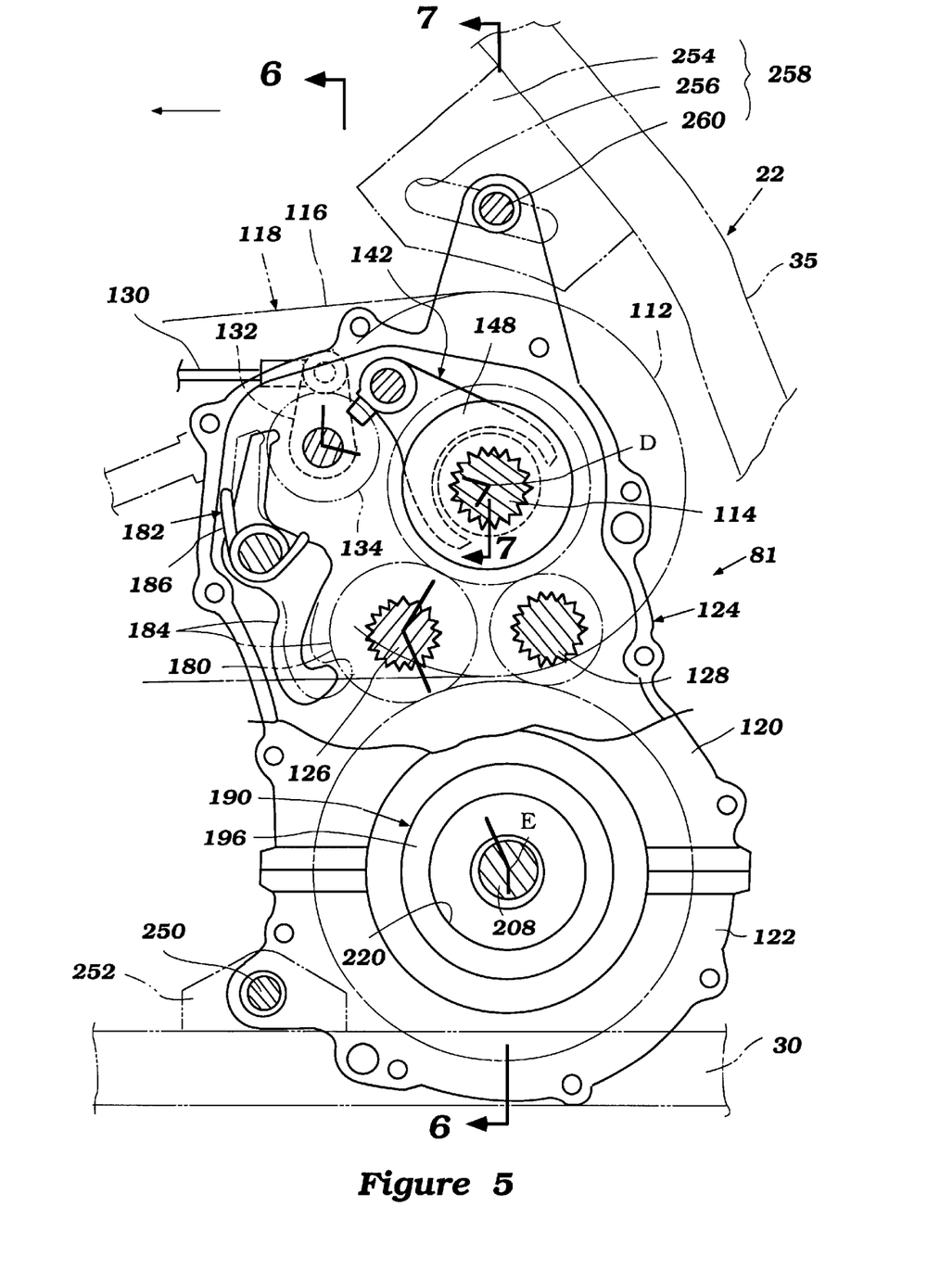
FIG. 5 is a further partial size view of the vehicle of FIG. 1 illustrating certain shafts of the final drive assembly in cross section and a transmission lock arrangement.
Figure 6:
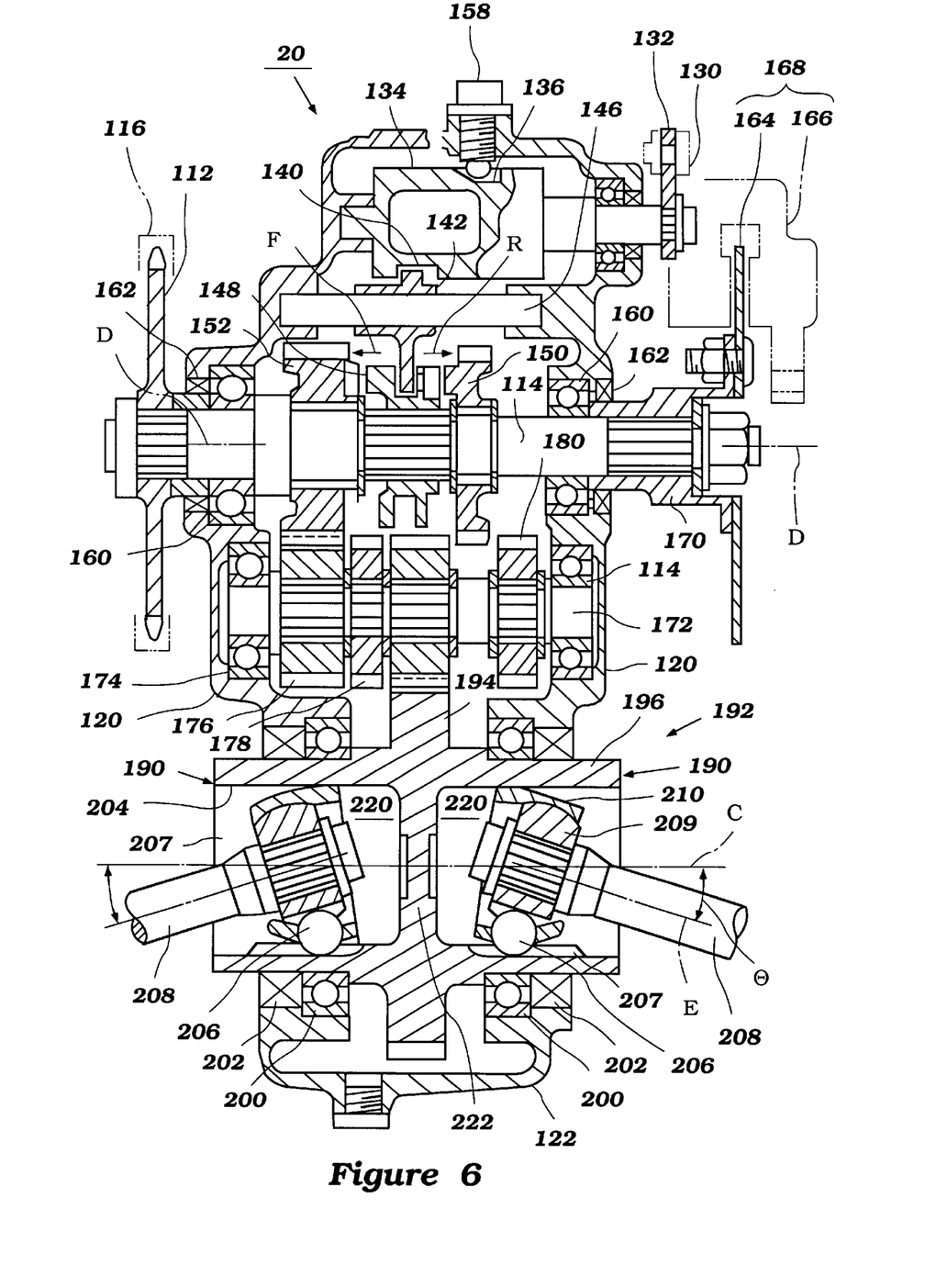
FIG. 6 is a cross section through FIG. 5 taken along the line 6—6 and illustrating a drive shaft drive arrangement.
Figure 7:
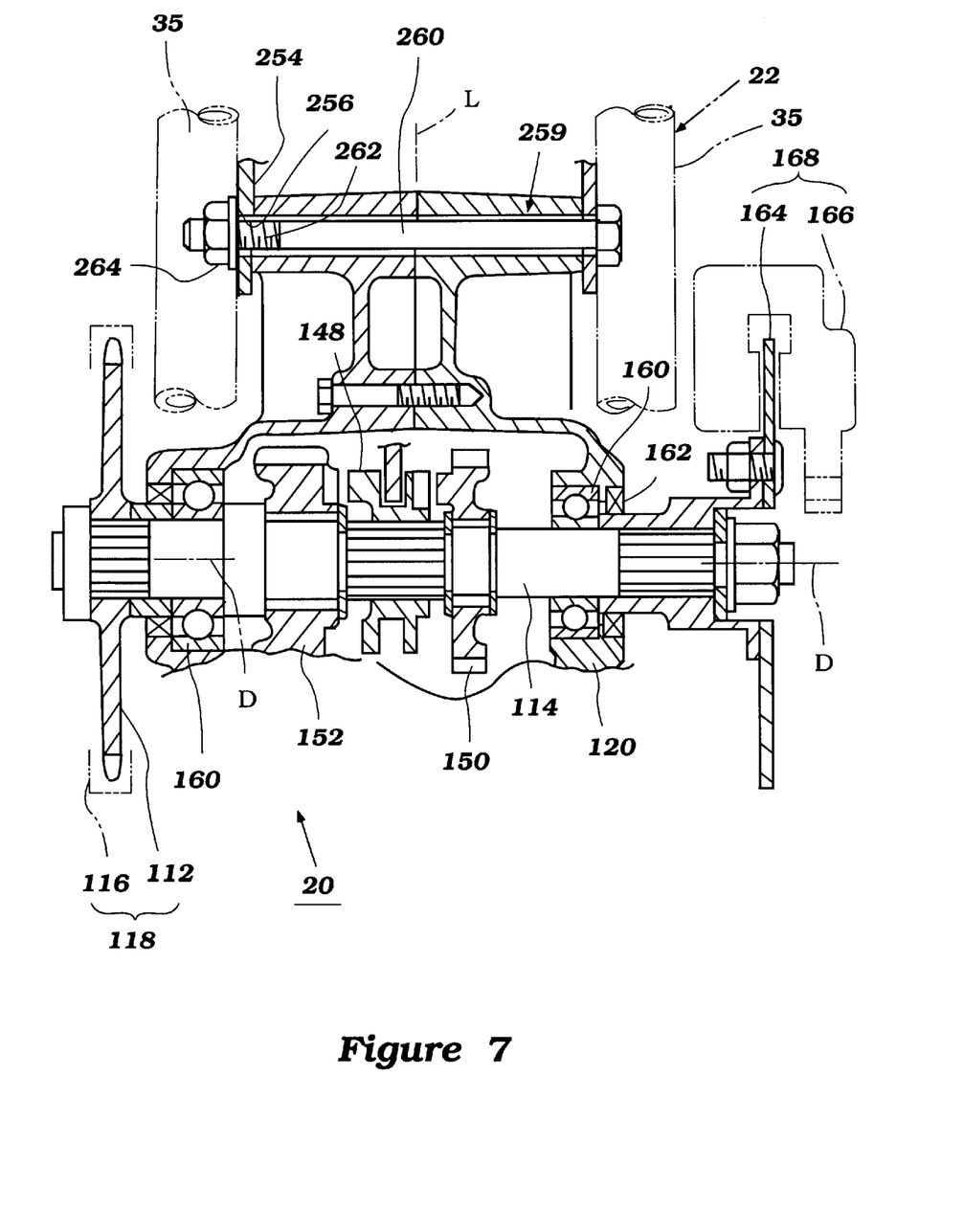
FIG. 7 Is a cross section through FIG. 5 taken along the line 7—7 and illustrating a tension adjustment arrangement.

With reference now to FIGS. 5–7, the final drive 81 and its connection to the rear wheels 26 will be described in detail. The final drive 81 preferably comprises a reduction drive assembly that allows the output of the engine 36 to be converted into a desired operating speed for the vehicle 20. Thus, the final drive 81 comprises an upper casing 120 and a lower casing 122. The casings 120, 122 generally define a final drive transmission chamber 124. A number of shafts and gears are mounted within the chamber 124.

The input shaft 114 rotates about a fourth axis D, as does the driven sprocket 112. The input shaft 114 selectively drives an intermediate shaft 126 or a reverse shaft 128. More particularly, the vehicle 20 preferably includes a shifting arrangement that enables an operator to select either a forward mode of operation or a reverse mode of operation. The input shaft 114 thereby is selectively coupled to an intermediate shaft 126 or a reverse shaft 128 to accomplish such a mode of operation. The intermediate shaft 126 and the reverse shaft 128, in turn, are engaged with an output arrangement that will be described below.

With reference now to FIGS. 5 and 6, the shifting arrangement and the shaft arrangement will be further described. The final drive is shifted with a shift lever or push button that preferably is disposed proximate an operator of the vehicle 20. The shift lever or push button acts on a cable 130, which is preferably of the Bowden wire type. The cable 130, in turn, is connected to a pivot arm 13:2.

Movement of the cable effects a rotation of a shaft 134 to which the pivot arm 132 is secured. The shaft 134 preferably includes a pair of channels that extend around at least partially around the circumference of the shaft 134.

The first channel 136 has a changing profile. A sensor and ball arrangement 138 can detect the position of the shaft 134 from a position of the ball relative to the sensor. As the ball moves radially away from a center of the shaft, the sensor detects the movement and registers change in shift position. Similarly, as the ball moves radially toward a center of the shaft, the sensor detects the movement and registers the change in shift position.

The second channel 140 is in registry with a dog clutch 142 that translates along a shaft 146. As the dog clutch moves in the direction R, the dog clutch 142 urges a transfer gear 148 into engagement with a reverse gear 150. Similarly, as the dog clutch moves in the direction F, the dog clutch 142 urges the transfer gear 148 into engagement with a forward gear 152. If the dog clutch 142 is positioned between the two positions, neither gear 150, 152 is engaged and the final drive 81 is in, a neutral position.

The driven sprocket 112 is secured, to the input shaft 114. The input shaft is journaled by bearings 160 and sealed at both ends of the case 120. In addition, the input shaft carries a brake disk 164 at the end opposite the driven sprocket 112. The brake disk 164 cooperates with a caliper arrangement 1156 to form a brake arrangement 168. The brake disk 164 is secured to the shaft 114 with a hub 170. Of course, other braking arrangements also are possible; however, the illustrated arrangement renders a compact construction that effects braking of both independently driven rear wheels 26 with a single brake disk 164.

The input shaft 114 also carries a number of gears. The forward gear 152 and the reverse gear 150 are disposed on the shaft 114 to allow the gears 150, 152 to freely rotate relative to the shaft. The transfer gear 148 is splined to the shaft 114 such that it is fixed for rotation with the shaft 114. The transfer gear 148, however, can translate along the shaft 114. The transfer gear 148, as described above, allows the operator to selectively couple in input shaft 114 with either the reverse shaft 128 or the forward shaft 126.

A transfer shaft 172 also is jounaled by bearings 174 that are positioned within the illustrated case 120. The transfer shaft 172 carries a number of gears that are used to drive an output arrangement. A forward transfer gear 176 is engaged with the forward gear 152 and a reverse transfer gear 178 is engaged with a gear positioned on the reverse shaft 128. The two transfer gears 176, 178 preferably are affixed for rotation with the shaft 172.

The shaft 172 also carries a brake gear 180. The brake gear 180 forms a portion of a transmission parking brake assembly 182. With reference to FIG. 5, the transmission parking brake assembly 182 comprises a biased lever 184 that can be brought into engagement with the gear 180 to lock the gear 180 (and the shaft 172) from rotation. The lever 184 preferably is biased with a torsion spring 186 such that the lever is not engaged with the gear 180. The other end of the lever 184 rides along a surface of the shifting shaft 134 and moves radially outward when the shifting lever is placed in a park position. Thus, movement of the shifting lever into a park position effects outward movement of the first end of the lever 184 against the biasing force of the spring 186 and the other end of the lever moves into engagement with the brake gear 180.

The intermediate shaft 172 drives an output arrangement 190 that will be described with reference to FIG. 6. The output arrangement 190 generally comprises a pair of constant velocity couplings 192. The coupling 192 generally comprises a gear portion 194 and a housing portion 196. In the illustrated arrangement, the two portions 194, 196 are integrally formed as are the two couplings 192; of course, in other arrangements, the two portions can be separately formed and affixed together. Combining the two couplings 192 into a single housing member 194 allows the two couplings 192 to be arranged more compactly. More particularly, the two couplings 192 can be moved closer to the centerline of the vehicle by forming them in a single member. In addition, the drive gear portion 194 being formed integrally with both of the couplings 192 allows for a more compact transmission arrangement.

The output arrangement 190 is journaled for rotation within the casing 120, 122 by a set of bearings 200 and the casing is sealed by a set of seals 202. The housing portion is generally cylindrical and includes a shoulder that the bearings 200 seat against to secure the output arrangement in axial position.

The output arrangement 190 allows for plunging movement of one of the rear wheels 26 relative to the other. The housing portion 196 includes an inner cylindrical surface 204 with a series of cylindrical bores 207. The bores 207 carry a set of balls 206.

A set of half shafts 208 extend into the housing portion 196. At the end of the half shafts 208, a set of inner members 209 are splined in position along the illustrated half shafts 208. The inner members 209 are received within cages 210. The inner members 209 preferably are grooved to also receive the balls 206 and the outer surfaces of the inner members 209 preferably are ground to a sphere.

The balls 206 are housed in recessed formed within the cage 210 and the cage 210 preferably is ground on its inside to fit the outer surface of the inner member 209 while its outer surface is ground to a second sphere that offsets from the first sphere. The outer surface of the cage 210 fits the cylindrical inner surface 204 of the housing portion 196. Thus, the inner members 209 can move along the bore of the housing portion 196. The offsetting spherical surfaces keeps the plane of the balls in the plane bisecting the angle between the shaft axes in order to keep the constant velocity ratio.

The housing portion 196 also comprises a set of inner spaces 220 that are defined between the inside surfaces of the cages 210 and a dividing wall 222 that separates the two sides from one another. Advantageously, the dividing wall also reinforces the housing portion 196. The inner spaces 220 preferably are filled with grease or other lubricant. The grease lubricates the inner members 209 and the balls 206. The illustrated arrangement advantageously reduces unequal distribution of the grease from one inner space to the other. For instance, due to the dividing wall 222, the grease cannot be forced into one inner space 220 or the other under centrifugal loading or during cornering. Thus, shifting of lubricant can be eliminated.

Of course, in some arrangements, the wall 222 can be eliminated. In these arrangements, the grease is trapped between the two cages 210 and unequal lubrication is not an issue. If the inner spaces 220 are joined and the housing portion 196 is formed as a tube, then the inner diameter within the housing portion 196 preferably is substantially constant throughout. Such a configuration can further reduce the distance between the outer cylindrical surfaces of the housing portion 196. Thus, the distance between the inner members 209 can be reduced and the overall lateral dimension of the output arrangement can be reduced. This translates into a further improved range of movement for the half shafts 208.

With reference again to FIG. 3, the half shafts 208 are joined to stub shafts 230 of the wheels 26 using a further constant-velocity couplings 232. The stub shafts 230 are journaled within the carrier hub 70 in a known manner. The constant-velocity couplings can be any suitable constant-velocity coupling.

With reference now to FIG. 5, the final drive 81 preferably is arranged for pivotal movement relative to the frame assembly 22 By pivoting the final drive 81, the tension in the flexible drive element 116 can be adjusted. To this end, the casing 122 preferably includes a pivot member 250. The pivot member 250 connects to a set of brackets 252 that are attached to the frame assembly 22. Thus, the final drive 81 can be pivoted about this pivot member 250.

A second set of brackets 254 are connected to the frame assembly 22 and include a slot 256. The casing 120 includes a boss with a further pivot member 260. Together, the pivot member, the slot and the bracket define a tension adjustment region 258. The pivot member 260 can be secured in position along the slot through any suitable technique, such as a lock 259. In the illustrated arrangement, the pivot member 260 includes a threaded member 262 (i.e., a bolt) to which a nut 264 can be secured. The nut 264 and a washer can be used to friction load the pivot member 260 in position along the bracket 254. It is anticipated that the bolt can be replaced by threaded inserts stub shafts, and the like. The bracket 254 also can include a number of settings defined by transversely extending slots such that a particular slot can be selected to alter the tension setting T.

The angular positioning of the final drive 81 relative to the frame assembly 22 also can be adjusted using the support rod 270. The support rod 270 generally comprises a tie rod 272 and a pair of turnbuckles 274. One of the turnbuckles preferably is positioned along a cross member 275 that extends between the two sides of the frame assembly 22. The other turnbuckle connects to the casing 120. By adjusting the turnbuckles 274, the tie rod 272 can be adjusted such that the relative position of the final drive 81 and the frame assembly 22 can be adjusted. The support rod eases the task of increasing the tension in the flexible transmitter because the support rod can be turned relative to the turnbuckles to separate the turnbuckles. For this reason, among others, the turnbuckles have opposing threads (i.e., turning the support rod spreads the turnbuckles rather than translates the support rod). Additionally, the support rod can include a hex portion or other surface configuration to allow a wrench or the like to grip the support rod for turning.

The split shafts 208 each rotate about a center axis E. An angle 0) is defined between the axis E and the axis C. This angle defines the angle at which the shaft 208 is extending relative to a generally horizontal plane (such as that defined by the ground or the undercarriage of the vehicle 20).

Thus, the illustrated arrangement provides a drive unit, which is easy to install during production operations. The drive unit features a final drive that is separated from the engine and that is connected to the engine by a flexible transmitter. The flexible transmitter can be easily retensioned due to a pivotal connection between the final drive and a frame of the vehicle. The final drive, however, can be rigidly fixed in position to oppose reaction forces during vehicle operation. In addition, the construction of the illustrated final drive increases the clearance zone over standard chain driven rear axles because of the placement of the larger driven sprocket in an upper portion of the final drive.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. An all terrain vehicle comprising a frame, said frame comprising a lower frame, at least one rear wheel being mounted to said frame and at least one front wheel being mounted to said frame, an engine compartment defined within said frame between said front wheel and said rear wheel, an engine being mounted within said engine compartment, a final drive being pivotally mounted to said frame separately from said engine, a drive shaft connecting said rear wheel and said final drive with said rear wheel being drivingly connected to said engine through said final drive, said drive shaft extending generally transverse to a longitudinal plane that substantially bisects said frame, said final drive being positioned such that at least a portion of said final drive is intersected by said drive shaft, said final drive comprising a driven sprocket, an input shaft connected to said driven sprocket and a transfer shaft, said engine comprising a drive sprocket, said drive sprocket being drivingly connected to said driven sprocket by a flexible transmitter and said driven sprocket being positioned to lie entirely above a plane defined by said lower frame.

2. The vehicle of claim 1, wherein said final drive is pivotally attached to said lower frame.

3. The vehicle of claim 2, wherein said final drive can pivot about a generally transverse axis.

4. The vehicle of claim 3, wherein said driven sprocket can move longitudinally relative to said drive sprocket as said final drive pivots about said generally transverse axis.

5. The vehicle of claim 2, further comprising a support rod, said support rod being connected to an upper portion of said final drive and to said frame assembly, said support rod securing said final drive in a pivotal position relative to said frame assembly.

6. The vehicle of claim 5, wherein said support rod comprises a threaded member and at least one turnbuckle, said threaded member being threaded into said turnbuckle to secure said final drive in said pivotal position relative to said frame assembly.

7. The vehicle of claim 5, wherein said support rod extends in a generally longitudinal direction.

8. The vehicle of claim 2, further comprising a bracket being connected to said frame assembly and a pivot post connected to said final drive, said bracket comprising an elongated slot having a major axis that extends along a path defined by said pivot post as said final drive pivots relative to said lower frame.

9. The vehicle of claim 8, wherein said pivot post is positioned proximate said driven sprocket.

10. The vehicle of claim 8, wherein said pivot post comprises a threaded fastener that can be tightened against said bracket.

11. The vehicle of claim 2, wherein said final drive is connected to said frame in at least three locations.

12. The vehicle of claim 2, wherein said final drive is connected to said frame in only five locations.

13. The vehicle of claim 1, wherein said final drive is connected to said frame assembly in at least three locations.

14. The vehicle of claim 1 further comprising a rear wheel braking arrangement, said rear wheel braking arrangement being connected to said final drive, said rear wheel braking arrangement comprising a brake disc and a caliper, said caliper being positioned along a circumference of said brake disc, said brake disc being connected to a shaft of said final drive.

15. The vehicle of claim 14, wherein said brake disc is secured to an input shaft of said final drive and said driven sprocket is secured to said input shaft.

16. The vehicle of claim 15, wherein said brake disc is secured to a first end of said input shaft and said driven sprocket is secured to a second end of said input shaft.

17. The vehicle of claim 16, wherein said brake disc is positioned outside of said frame assembly and said final drive is positioned inside of said frame assembly.

18. An all terrain vehicle comprising a frame, a pair of rear wheels being rollably mounted to said frame, at least one front wheel being rollably mounted to said frame, said rear wheels turning about a first axis and said at least one front wheel turning about a second axis, an engine being mounted to said frame between said first axis and said second axis, a final drive being mounted to said frame and being separated from said engine, said rear wheels being drivingly connected to said engine, said final drive being at least partially positioned between said rear wheels and being pivotally attached to said frame, said final drive comprising an upper portion, a lower portion and a driven sprocket, said final drive also comprising an input shaft, a transfer shaft and an output arrangement, said input shaft being journaled within said upper portion of said final drive, said driven sprocket connected to said input shaft, said input shaft driving said output arrangement, said engine comprising an output shaft and a drive sprocket, said drive sprocket being drivingly connected to said output shaft, and said drive sprocket powering said driven sprocket with a flexible transmitter.

19. The vehicle of claim 18, wherein said input shaft turns about a third axis, said transfer shaft turns about a fourth axis, said output arrangement turns about a fifth axis, and said third axis is positioned above said fifth axis.

20. The vehicle of claim 19, wherein said fourth axis is positioned above said fifth axis.

21. The vehicle of claim 20, wherein said third axis is positioned above said fourth axis.

22. The vehicle of claim 18, wherein said final drive is pivotally attached to said frame by a pivot member that extends generally transverse to a longitudinally extending plane that substantially bisects said vehicle.

23. The vehicle of claim 22, wherein said pivot member intersects a lower portion of said final drive.

24. The vehicle of claim 23, wherein said pivot member intersects a forward portion of said lower portion of said final drive.

25. The vehicle of claim 24 further comprising at least one securing member connecting said final drive to said frame assembly.

26. The vehicle of claim 25, wherein said securing member comprises a generally longitudinally extending support shaft.

27. The vehicle of claim 26, wherein said support shaft interconnects an upper portion of said final drive and said frame assembly.

28. The vehicle of claim 27, wherein said support shaft interconnects said upper portion of said final drive with a portion of said frame assembly disposed generally forward of said final drive.

29. The vehicle of claim 28, wherein said portion of said frame assembly is a cross member.

30. The vehicle of claim 25, wherein said securing member comprises a slotted bracket and post assembly.

31. The vehicle of claim 30, wherein said slotted bracket is secured to said frame assembly and said post is secured to said final drive.

32. The vehicle of claim 30, wherein said slotted bracket and post assembly further comprises a threaded fastener that secures said post to said bracket.

33. The vehicle of claim 30, wherein said slotted bracket comprises a slot that fixes an upper limit and a lower limit of adjustment between said drive sprocket and said driven sprocket.

34. The vehicle of claim 33, wherein said slot is arcuate in shape.

35. The vehicle of claim 18, wherein said transfer shaft transfers rotational movement within said final drive between said input shaft and said output arrangement.

* * * * *